(12) United States Patent
Rothwell et al.

(10) Patent No.: US 11,738,617 B2
(45) Date of Patent: Aug. 29, 2023

(54) CONTROL APPARATUS, SYSTEM, AND METHOD FOR PROVIDING ASSISTANCE TO A VEHICLE DRIVER

(71) Applicant: Jaguar Land Rover Limited, Coventry (GB)

(72) Inventors: Victoria Rothwell, Coventry (GB); Jason Walters, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 399 days.

(21) Appl. No.: 16/493,417

(22) PCT Filed: Mar. 12, 2018

(86) PCT No.: PCT/EP2018/056113
§ 371 (c)(1),
(2) Date: Sep. 12, 2019

(87) PCT Pub. No.: WO2018/166986
PCT Pub. Date: Sep. 20, 2018

(65) Prior Publication Data
US 2020/0130452 A1 Apr. 30, 2020

(30) Foreign Application Priority Data
Mar. 17, 2017 (GB) .................................... 1704265

(51) Int. Cl.
*B60G 17/0165* (2006.01)
*B60G 17/017* (2006.01)
(Continued)

(52) U.S. Cl.
CPC ....... *B60G 17/0165* (2013.01); *B60G 17/017* (2013.01); *B60G 17/01908* (2013.01);
(Continued)

(58) Field of Classification Search
None
See application file for complete search history.

(56) References Cited

U.S. PATENT DOCUMENTS 5,436,836 A 7/1995 Holtz et al.
6,604,595 B2 * 8/2003 Sakakiyama .......... B60K 17/35
180/233

(Continued)

FOREIGN PATENT DOCUMENTS

DE  10 2015 007 036 A1  12/2016
EP   0 412 288 A1   2/1991
(Continued)

OTHER PUBLICATIONS

International Search Report and Written Opinion of the International Searching Authority, International Application No. PCT/EP2018/056113, dated Jun. 22, 2018, 12 pp.
(Continued)

*Primary Examiner* — David P. Merlino
(74) *Attorney, Agent, or Firm* — Reising Ethington P.C.

(57) ABSTRACT

An electronic controller (10) for a motor vehicle (100), the controller being configured to determine when at least one wheel (111, 112, 114, 115) has lost traction, wherein when the controller (10) determines that at least one wheel (111, 112, 114, 115) has lost traction the controller (10) is configured to provide an output to a driver indicative of the at least one wheel (111, 112, 114, 115) that has lost traction.

10 Claims, 14 Drawing Sheets

(51) Int. Cl.
*B60G 17/019* (2006.01)
*B60K 35/00* (2006.01)

(52) U.S. Cl.
CPC .... *B60G 2400/208* (2013.01); *B60G 2400/82* (2013.01); *B60G 2500/30* (2013.01); *B60K 35/00* (2013.01); *B60K 2370/167* (2019.05)

(56) References Cited

U.S. PATENT DOCUMENTS

| | | | |
|---|---|---|---|
| 7,349,776 B2 | 3/2008 | Spillane et al. | |
| 8,392,087 B2* | 3/2013 | Kodama | B60W 30/18027 701/75 |
| 9,096,198 B2* | 8/2015 | Inoue | B60T 8/172 |
| 9,758,167 B1* | 9/2017 | Pandit | B60W 30/188 |
| 2007/0193668 A1* | 8/2007 | Mathieu | B60C 27/00 152/171 |
| 2009/0240416 A1 | 9/2009 | Oral | |
| 2010/0250056 A1* | 9/2010 | Perkins | B60W 30/18172 701/33.4 |
| 2011/0160964 A1* | 6/2011 | Obradovich | H04L 43/08 701/41 |
| 2015/0057883 A1 | 2/2015 | Kelly et al. | |
| 2017/0096144 A1* | 4/2017 | Elie | G06K 9/2018 |
| 2017/0225535 A1* | 8/2017 | Batsch | B60G 17/0155 |
| 2018/0001887 A1* | 1/2018 | Watanabe | B60W 30/146 |

FOREIGN PATENT DOCUMENTS

| | | |
|---|---|---|
| GB | 2492655 B | 5/2014 |
| GB | 2492748 B | 5/2014 |
| GB | 2499461 B | 8/2014 |
| GB | 2507622 B | 1/2015 |
| GB | 2499279 B | 3/2015 |
| GB | 2508464 B | 3/2015 |
| GB | 2523096 A | 8/2015 |
| GB | 2527100 A | 12/2015 |
| GB | 2539258 A | 12/2016 |
| WO | 2013/124321 A1 | 8/2013 |
| WO | 2014/139875 A1 | 9/2014 |
| WO | 2016/190201 A1 | 12/2016 |

OTHER PUBLICATIONS

Patents Act 1977: Combined Search and Examination Report under Sections 17 and 18(3), UKIPO Application No. GB1704265.6, dated Aug. 16, 2017, 6 pp.

* cited by examiner

CONTROL APPARATUS, SYSTEM, AND METHOD FOR PROVIDING ASSISTANCE TO A VEHICLE DRIVER

RELATED APPLICATIONS

This application is a 35 U.S.C. § 371 national stage application of PCT Application No. PCT/EP2018/056113, filed on Mar. 12, 2018, which claims priority from Great Britain Patent Application No. 1704265.6, filed on Mar. 17, 2017, the contents of which are incorporated herein by reference in their entireties. The above-referenced PCT International Application was published in the English language as International Publication No. WO 2018/166986 A1 on Sep. 20, 2018.

INCORPORATION BY REFERENCE

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

FIELD OF THE INVENTION

Embodiments of the invention relates to a system for assisting a driver to recover a vehicle that has become immobilised. In particular, but not exclusively, some embodiments of the invention relate to a system for assisting a driver to recover a vehicle that has become immobilised in an off-road driving environment.

BACKGROUND

When a user is driving off-road over a deformable surface such as relatively deep snow, sand, mud or another deformable surface that requires high ground clearance, the vehicle may become beached and thereby unable to make adequate progress over terrain. When the vehicle is stuck, one or more wheels may spin due to a lack of contact between the tyre and ground due to the surface being soft. The present applicant has recognised, that, if the user is driving solo, and a second person is not available to tell them which of the one or more wheels are spinning, it can be difficult to know which wheels require traction aids in order to free the vehicle in the most efficient manner.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/ snow, mud and ruts, rock crawl, sand and a highway mode known as 'special programs off' (SPO). The vehicle mode controller may be referred to as a Terrain Response (TR)™ System or controller. The driving modes may also be referred to as terrain modes, terrain response modes, or control modes. GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate.

It is against this background that the present invention has been conceived. Embodiments of the invention may provide an apparatus, a method or a vehicle which addresses the above problems. Other aims and advantages of the invention will become apparent from the following description, claims and drawings.

SUMMARY OF THE INVENTION

In one aspect of the invention for which protection is sought there is provided an electronic controller for a motor vehicle, the controller being configured to determine when at least one wheel has lost traction, wherein when the controller determines that at least one wheel has lost traction the controller is configured to provide an output to a driver indicative of the at least one wheel that has lost traction.

Embodiments of the present invention have the advantage that a solo driver of a vehicle may be provided with assistance in recovering a vehicle in an off-road driving scenario. A solo driver may be unable to determine which wheel of the vehicle is failing to gain traction, and therefore be unable to determine which wheel requires a traction aid. Embodiments of the present invention overcome this problem by providing an indication of the location of each wheel that is rotating at a speed exceeding the predetermined speed.

The controller may be configured to determine vehicle speed over ground by reference to the speed of each drive wheel. In addition the controller may receive information indicative of a speed of each non-driven wheel. Thus in a two wheel drive vehicle having four road wheels the controller may receive a wheel speed signal in respect of each of the four road wheels. The controller may calculate a vehicle reference speed value and use this reference speed value as the vehicle speed over ground. The reference speed value may be substantially equal to the speed of the second slowest turning wheel. Other arrangements may be useful.

The controller may be configured to determine that a wheel has lost traction when a speed of the wheel exceeds a predetermined value for more than a predetermined time period whilst the vehicle remains substantially stationary.

Thus the controller may determine that the wheel has lost traction if the wheel speeds exceeds a predetermined minimum value such as 2 kph, 3 kph or any other suitable value for more than a period of 0.5 s, 1 s or any other suitable value whilst vehicle speed over ground remains substantially zero. This enables the controller to distinguish between initial wheel spin due to aggressive acceleration from rest on a surface of relatively high surface coefficient of friction and wheel spin due to a vehicle being beached or otherwise unable to move over a surface.

The controller may be further configured to receive information indicative of driving surface gradient, wherein the controller is configured, when the vehicle is stationary and the controller determines that at least one wheel has lost traction, to provide an indication to the driver whether a traction aid should be employed in dependence at least in part on driving surface gradient.

The controller may be further configured, when the vehicle is stationary and the controller determines that at least one wheel has lost traction, to provide an indication to the driver whether a traction aid should be placed in front of a wheel or behind a wheel in dependence at least in part on driving surface gradient.

Optionally, if the information indicative of driving surface gradient indicates that the vehicle is travelling up a gradient, the controller is configured to provide an indication that the traction aid should be placed behind the at least one wheel and if the information indicative of driving surface gradient indicates that the vehicle is travelling down a gradient, the controller is configured to provide an indication that the traction aid should be placed in front of a wheel.

Optionally, in the event that the controller determines that the vehicle is stationary and at least one wheel has lost traction, the controller is configured to output a sequence of instructions to assist the driver to recover the vehicle.

The controller may be further configured to receive information indicative of an amount of droop of each wheel, wherein if the vehicle is stationary and the controller determines that at least one wheel has lost traction and at least one said at least one wheel that has lost traction is at substantially full droop, the controller is configured to provide a recommendation to the driver to raise a ride height of the vehicle.

The controller may be further configured to receive information indicative of an amount of droop of each wheel, wherein if the vehicle is stationary and the controller determines that at least one wheel has lost traction and at least one said at least one wheel that has lost traction is at substantially full droop, the controller is configured automatically to raise a ride height of the vehicle.

Optionally, the controller being configured automatically to raise a ride height of the vehicle comprises the controller being configured automatically to request a driver to confirm that the driver wishes ride height to be raised, the controller being configured automatically to cause ride height to be raised if the driver confirms that the driver wishes ride height to be raised.

Optionally, the controller is configured to receive information indicative of wheel speed, the controller being configured to determine information indicative of vehicle speed over ground based at least in part on the information indicative of wheel speed.

The controller may be configured to receive information indicative of wheel speed and information indicative of vehicle speed over ground.

The information indicative of vehicle speed over ground may be received from an inertial measurement unit (IMU). The IMU may comprise one or more gyroscopic devices and/or one or more accelerometers. Alternatively or in addition, as noted above, the controller may calculate vehicle speed over ground itself, for example by reference to signals indicative of wheel speed from wheel speed sensors. In some embodiments, vehicle reference speed may be determined to be the speed of the second slowest turning wheel as determined by reference to the signals indicative of wheel speed.

The controller may comprise processing means, wherein the processing means comprises an electronic processor having an electrical input for receiving the information indicative of a speed of each driven wheel, and an electronic memory device electrically coupled to the electronic processor and having instructions stored therein, wherein the processor is configured to access the memory device and execute the instructions stored therein such that it is operable to provide an output to a driver indicative that a wheel has lost traction when the conditions are met that vehicle speed over ground is substantially zero, and at least one wheel is rotating at a speed exceeding a predetermined speed, and, when the conditions are met, to provide an indication to the driver of the location of each wheel that has lost traction.

The controller may be configured to determine that a wheel has lost traction based at least in part on information indicative of wheel speed and information indicative of vehicle speed over ground.

Alternatively or in addition the controller may be configured to determine that a wheel has lost traction based at least in part on an amount of torque detected at the wheel.

In a further aspect of the invention for which protection is sought there is provided a vehicle comprising a controller according to any preceding aspect.

In one aspect of the invention for which protection is sought there is provided a method implemented by means of an electronic controller, the method comprising determining when at least one wheel of a vehicle has lost traction based at least in part on information indicative of wheel speed and information indicative of vehicle speed over ground, whereby when it is determined that at least one wheel has lost traction the method comprises providing an output to a driver indicative of the at least one wheel that has lost traction.

Optionally, determining when at least one wheel of a vehicle has lost traction comprises determining when a speed of the wheel exceeds a predetermined value for more than a predetermined time period whilst the vehicle remains substantially stationary.

The method may comprise receiving information indicative of driving surface gradient, wherein the method comprises, when the vehicle is stationary and it is determined that at least one wheel has lost traction, providing an indication to the driver whether a traction aid should be employed in dependence at least in part on driving surface gradient.

The method may comprise, when the vehicle is stationary and it is determined that at least one wheel has lost traction, providing an indication to the driver whether a traction aid should be placed in front of a wheel or behind a wheel in dependence at least in part on driving surface gradient.

Optionally, if the information indicative of driving surface gradient indicates that the vehicle is travelling up a gradient, the method comprises providing an indication that the traction aid should be placed behind the at least one wheel and if the information indicative of driving surface gradient indicates that the vehicle is travelling down a gradient, the method comprises providing an indication that the traction aid should be placed in front of a wheel.

Optionally, in the event that it is determined that the vehicle is stationary and at least one wheel has lost traction, the method comprises outputting a sequence of instructions to assist the driver to recover the vehicle.

The method may further comprise receiving information indicative of an amount of droop of each wheel, whereby if the vehicle is stationary and it is determined that at least one wheel has lost traction and at least one said at least one wheel that has lost traction is at substantially full droop, the method comprises providing a recommendation to the driver to raise a ride height of the vehicle (100).

The method may further comprise receiving information indicative of an amount of droop of each wheel, wherein if the vehicle is stationary and it is determined that at least one wheel has lost traction and at least one said at least one wheel that has lost traction is at substantially full droop, the method comprises automatically raising a ride height of the vehicle (100).

Optionally, the controller being configured automatically to raise a ride height of the vehicle comprises the controller being configured automatically to request a driver to confirm that the driver wishes ride height to be raised, the method comprising automatically causing ride height to be raised if the driver confirms that the driver wishes ride height to be raised.

The method may comprise receiving information indicative of wheel speed, the method comprising determining information indicative of vehicle speed over ground based at least in part on the information indicative of wheel speed.

The method may comprise receiving information indicative of wheel speed and information indicative of vehicle speed over ground.

The method may comprise determining that a wheel has lost traction based at least in part on information indicative of wheel speed and information indicative of vehicle speed over ground.

Alternatively or in addition the method may comprise determining that a wheel has lost traction based at least in part on information indicative of an amount of torque detected at the wheel.

In an aspect of the invention for which protection is sought there is provided a non-transitory carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a non-transitory computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

It is to be understood that the controller or controllers described herein may comprise a control unit or computational device having one or more electronic processors. A control system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors. Other arrangements may also be useful.

Figure 1:
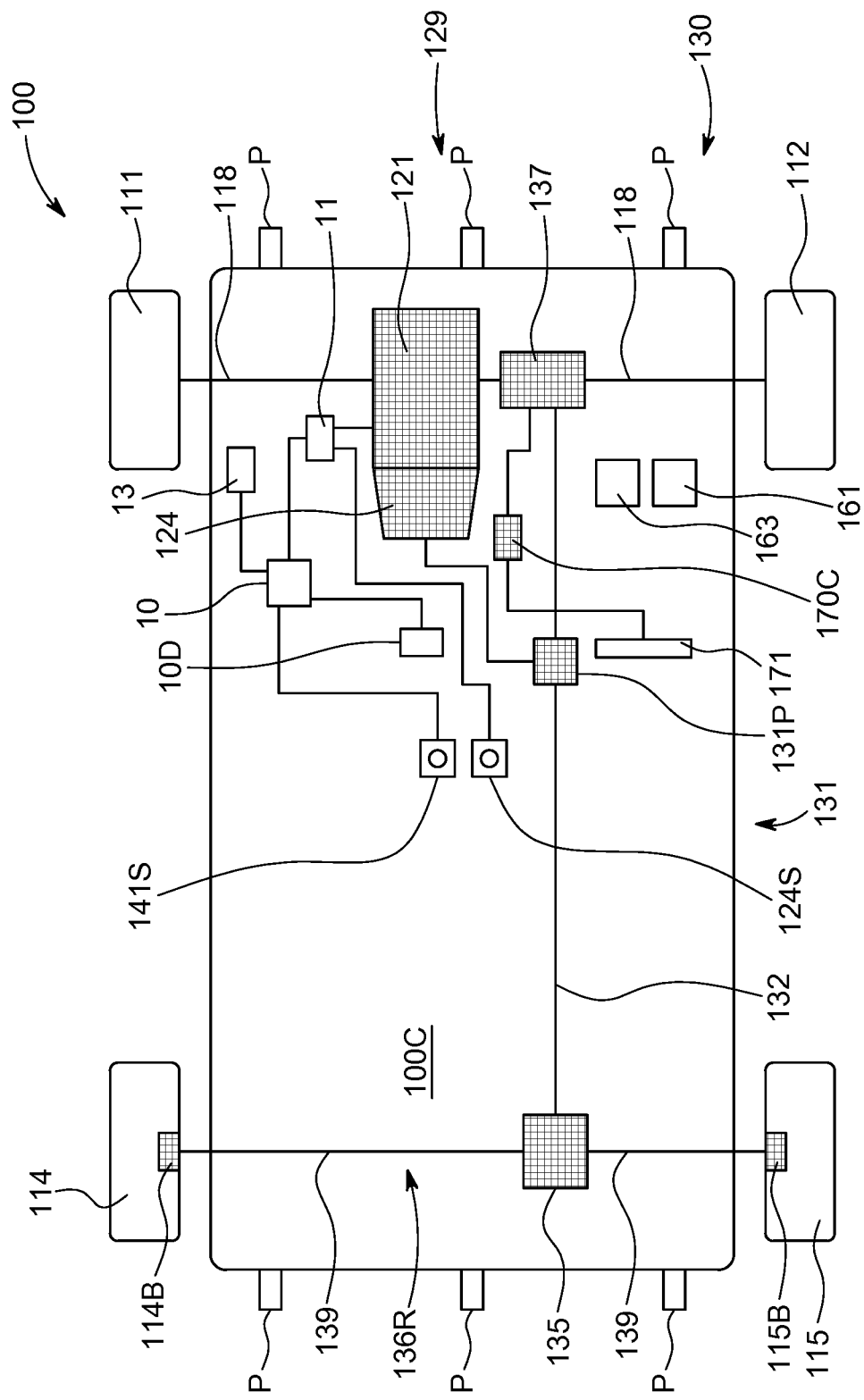
FIG. 1 is a schematic illustration of a vehicle according to an embodiment of the invention in plan view.
Figure 2:
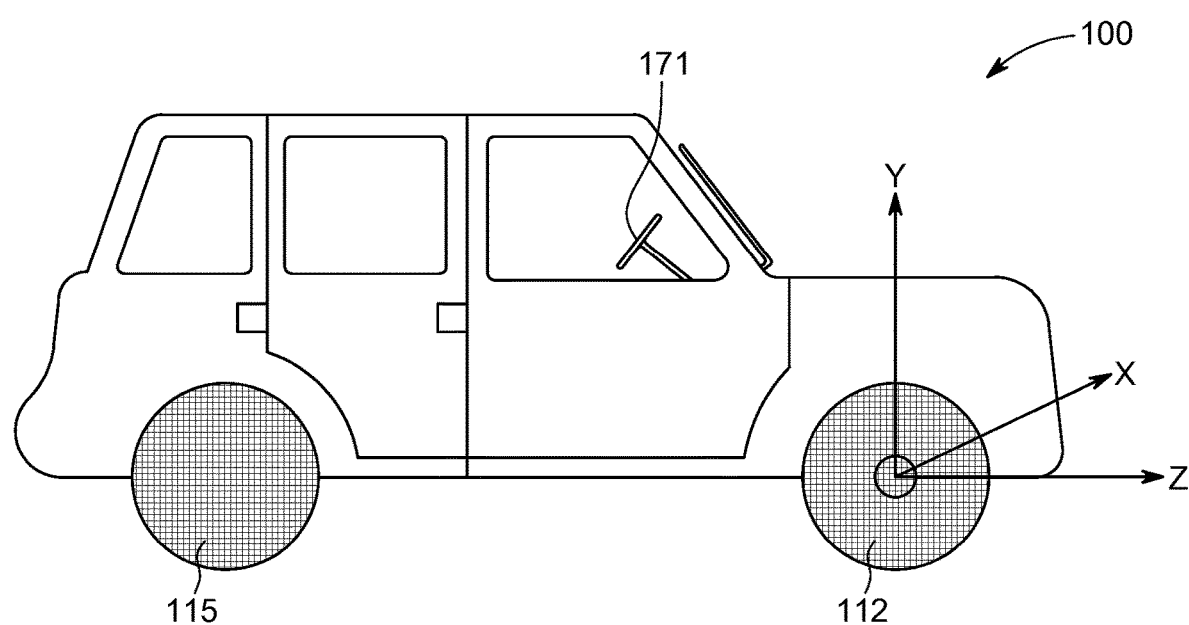
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
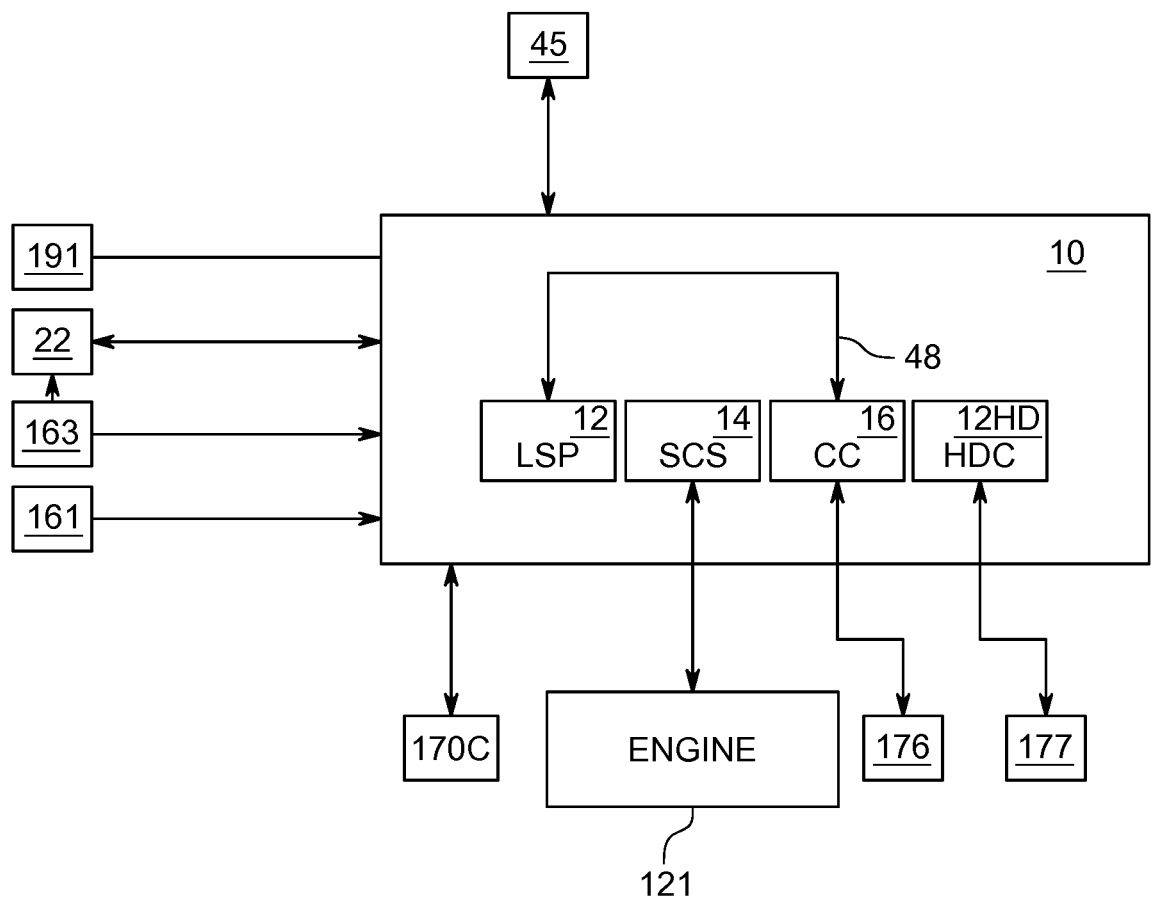
FIG. 3 is a schematic illustration of a portion of a control system of the vehicle of FIG. 1.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 4:
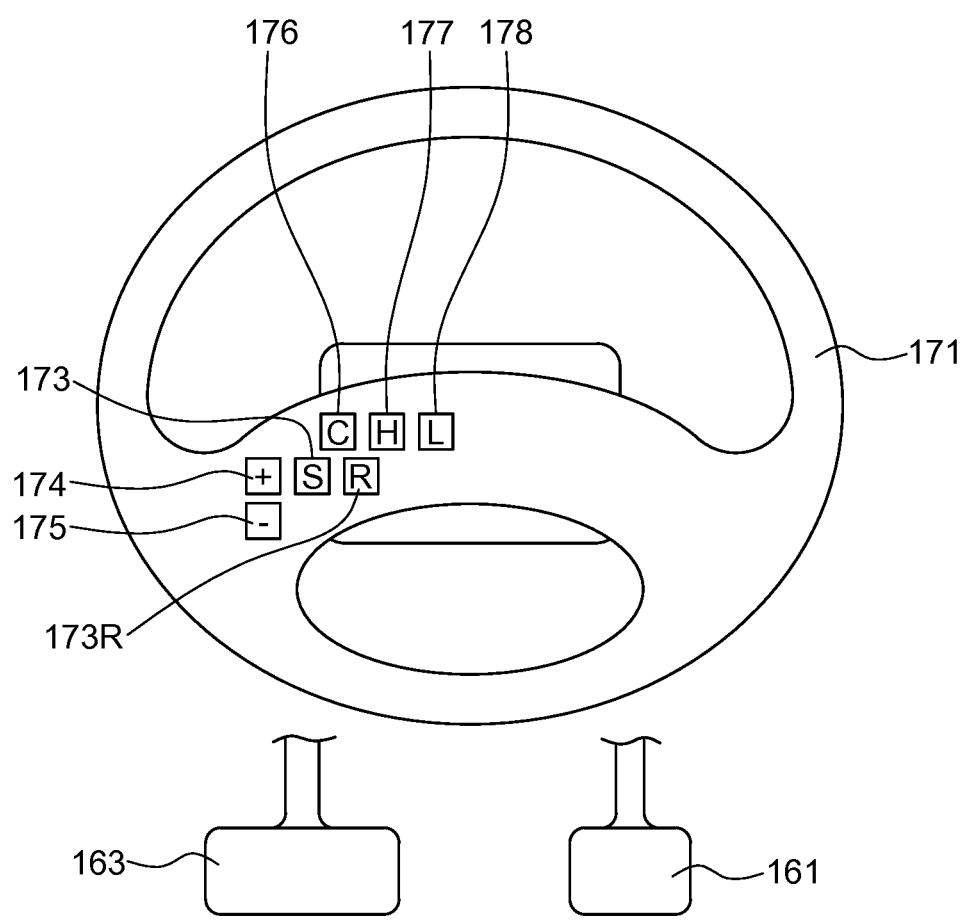
FIG. 4 is a schematic illustration of a steering wheel and pedals of the vehicle of FIG. 1.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing LSP control system selector button 178 mounted on steering wheel 171. The system 12 is operable to apply selective powertrain, traction control and braking actions to one or more wheels of the vehicle 100, collectively or individually.

The LSP control system 12 is configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, the desired value of user_set-speed as noted above by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 12HD is activated by depressing button 177 comprised by HDC system HMI 20HD and mounted on the steering wheel 171. When the HDC system 12HD is active, the system 12HD controls the braking system 22 in order to limit vehicle speed to a value corresponding to that of a HDC set-speed parameter HDC_set-speed which may be controlled by a user in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph. The HDC set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

It is to be understood that the VCU 10 is configured to implement a known Terrain Response (TR)™ System of the kind described above in which the VCU 10 controls settings of one or more vehicle systems or sub-systems including the powertrain controller 11 in dependence on a selected driving mode. The driving mode may be selected by a user by means of a driving mode selector 141S (FIG. 1). The driving modes may also be referred to as terrain modes, terrain response (TR) modes, or control modes. Further sub-systems under the control of the TR system include an air suspension system 191 by means of which ride height may be set to one of four settings corresponding to different heights of the vehicle above level ground, the SCS system and steering controller 170C.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

The LSP control system 12 causes the vehicle 100 to operate in accordance with the value of LSP_set-speed.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of the wheel_slip signal 48. Rather, the system 12 is arranged to monitor and subsequently manage wheel slip so as to reduce driver workload.

During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, suspension articulation (i.e. corresponding to the amount by which each wheel is displaced in a substantial vertical plane from a reference datum), an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C. The ePAS unit 170C also provides a signal indicative of steering wheel rotational position or angle.

In the present embodiment, the VCU 10 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted.

Other arrangements may be useful.

In the present embodiment, the VCU 10 is configured to monitor the speed of rotation of each of the wheels 111, 112, 114, 115 of the vehicle 100, the vehicle speed over ground, and the amount of droop of each wheel. In the present embodiment, speed over ground is determined by means of a vehicle reference speed value, calculated as being the speed of the second slowest turning wheel. Other methods of calculating a vehicle reference speed value may be useful.

The VCU 10 monitors the reference speed, and determines when the following conditions exist:
(i) the speed information indicates that vehicle speed over ground is substantially zero; and
(ii) at least one wheel is rotating at a speed exceeding a predetermined speed.

If the above conditions are met, the VCU 10 determines that the at least one wheel has lost traction over the driving surface.

The VCU 10 also monitors the amount of droop of each wheel. If the VCU 10 determines that at least one wheel has lost traction, it is configured to provide a recovery output to a driver if the wheel that has lost traction is at full droop.

The recovery output includes an output to the driver that indicates that the at least one wheel has lost traction. The indication of the location may be provided, for example, by means of a diagram of the vehicle with the location of the at least one wheel highlighted on the diagram. By providing the location of the wheel the VCU 10 identifies the wheel that has lost traction. That is, the VCU 10 provides an output indicative of the at least one wheel that has lost traction. In the present embodiment, the VCU 10 provides the indication of the location of the at least one wheel on a '4×4 information' or '4×4i' display. The 4×4i display also displays the position of the suspension (suspension articulation) of each wheel, i.e. the amount of droop of each wheel and the speed of rotation of each wheel at a given moment in time.

In addition to indicating the location of the one or more wheels that have lost traction, the VCU 10 also attempts to determine whether a traction aid should be located ahead of the vehicle (in front of a wheel, with respect to a front of the vehicle) or behind the vehicle (behind a wheel, with respect to a front of the vehicle). By front of the vehicle 100 is meant the leading portion of the vehicle when travelling in a normal forward direction. The traction aid may be any aid suitable for enhancing traction between a vehicle wheel and ground, such as a flexible traction mat or the like. An example of a pair of traction mats 100M are illustrated schematically in FIG. 5(*a*).

The VCU 10 is configured such that, if the vehicle 100 is travelling up a gradient, the VCU 10 provides an output to the driver suggesting that the traction aid be placed behind the one or more wheels that have lost effective contact, in addition to identifying the location of the one or more wheels.

If the vehicle 100 is travelling down a gradient, the VCU 10 provides an output to the driver suggesting that the traction aid may be placed ahead of the one or more wheels that have lost effective contact, in addition to identifying the location of the one or more wheels.

Figure 5A:
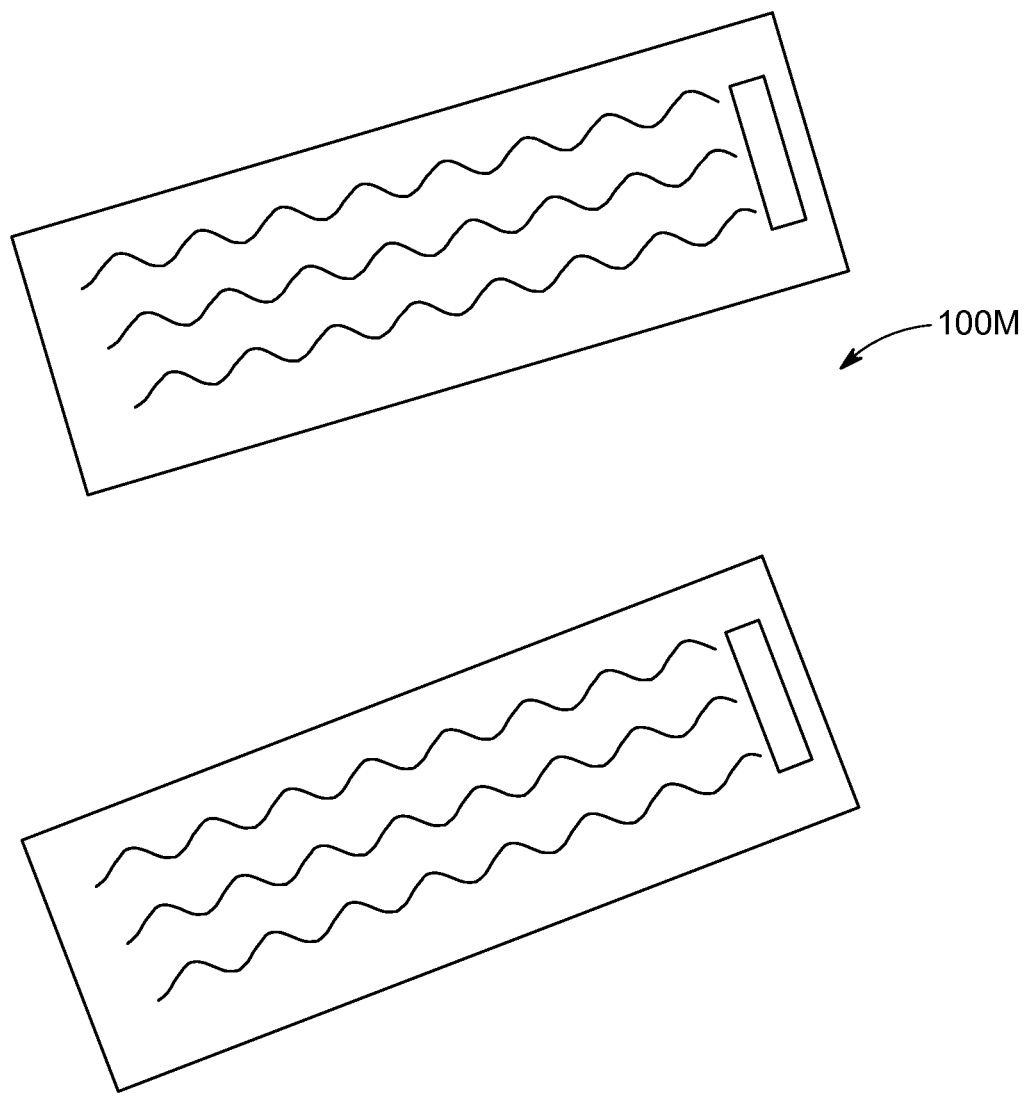
FIG. 5 shows (a) a pair of known traction aids suitable use with vehicles according to embodiments of the present invention, and (b) is a screen shot of a portion of a visual display of the vehicle of FIG. 1.
Figure 5B:
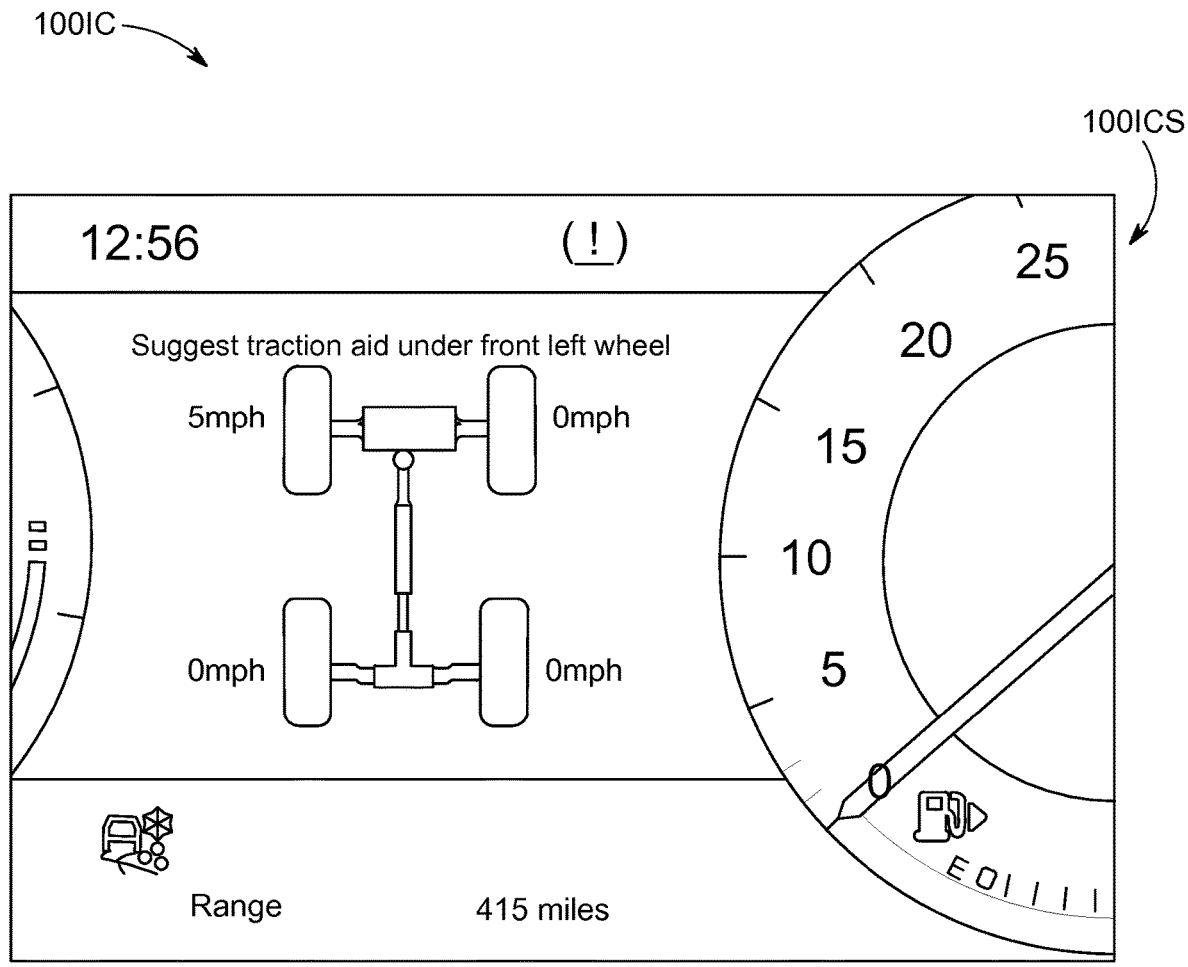

FIG. 5(*b*) shows a portion of the 4×4i visual display presented to a driver as part of the instrument cluster 100IC, next to a speedometer 100ICS of the cluster 100IC, showing a plan view schematic diagram of the vehicle 100. As noted above, the diagram includes an indication of the speed of rotation of each wheel of the vehicle at a given moment in time, enabling the driver to see which wheel has lost traction, as well as an indication of wheel droop. In the example shown the VCU 10 is providing a text output suggesting to the driver that a traction aid may be placed under the front left wheel of the vehicle 100 in order to attempt to recover the vehicle 100.

In the present embodiment, the VCU 10 determines whether the vehicle is travelling uphill or downhill by reference to a signal received from the gradient sensor 45. The gradient sensor provides an indication of vehicle pitch attitude (in degrees) relative to a horizontal plane (level pitch attitude). The VCU 10 stores, in a memory thereof, values of gradient of the driving surface as determined by reference to the signal received from the gradient sensor 45 as a function of distance travelled. From this data the VCU 10 is able to determine, regardless of an instant value of gradient signal, whether the vehicle is travelling uphill or downhill. This permits the VCU 10 to output a suggestion of the optimum location of the traction aid to assist the driver in recovering the vehicle 100. It is to be understood that a vehicle ascending a sand slope may attain a more level pitch attitude if front wheels of the vehicle sink into the sand surface. The chances of recovering the vehicle 100 may be much higher if the driver attempts to reverse the vehicle, down the slope, rather than attempting to drive the vehicle up the slope. Accordingly, whilst the gradient sensor 45 may indicate the driving surface is level, the VCU 10 may be able to determine that the vehicle is in fact ascending a slope by reference to gradient information over a preceding distance travelled, for example over the most recent 5 to 10 m of travel of the vehicle 100. Other distances of travel, such as shorter distances or longer distances, may be useful in determining gradient slope in some embodiments.

In some embodiments, the VCU 10 may implement a probability algorithm for estimating a probability of the driver being able to recover the vehicle 100. In an embodiment, the VCU 10 determines the probability of being able to recover the vehicle 100 by monitoring driver activity after the VCU 10 determines that the one or more wheels have lost traction and the vehicle 100 is stationary. That is, the VCU 10 monitors driver activity after the VCU 10 determines that vehicle speed has fallen to substantially zero, and one or more wheels are at full droop and are spinning at a speed exceeding a predetermined speed. The VCU 10 is configured such that the probability of recovery determined by the VCU 10 falls as the amount of time for which the wheels spin following loss of effective ground contact increases. If the VCU 10 determines that the probability of recovery is below a predetermined value, the VCU 10 may suggest that a driver to seek external assistance rather than attempt to recover the vehicle 100 using a traction aid.

In some embodiments, the VCU 10 may monitor the amount of torque applied to one or more wheels, and the amount of forward acceleration of the vehicle 100. If the amount of torque applied is determined to be sufficiently high to cause motion over the surface for the instant value of gradient if all four wheels were in effective contact with ground, and yet substantially no forward acceleration is detected (by reference for example to a signal from an inertial measurement unit, IMU), and in addition spin of one or more wheels above a predetermined amount is detected, the VCU 10 may determine that the vehicle 100 is failing to make adequate progress over terrain. The VCU 10 then determines whether the one or more wheels that have lost traction are at full droop. If it is determined that one or more wheels that have lost traction are at full droop, the VCU 10 proceeds to suggest that the driver raises vehicle ride height. The VCU 10 then provides an appropriate recovery output to the driver. As noted above, the recovery output includes an indication of the location of the one or more wheels that have lost effective ground contact, and a suggestion as to whether a traction aid should be located ahead of the wheel or behind the wheel.

Figure 6:
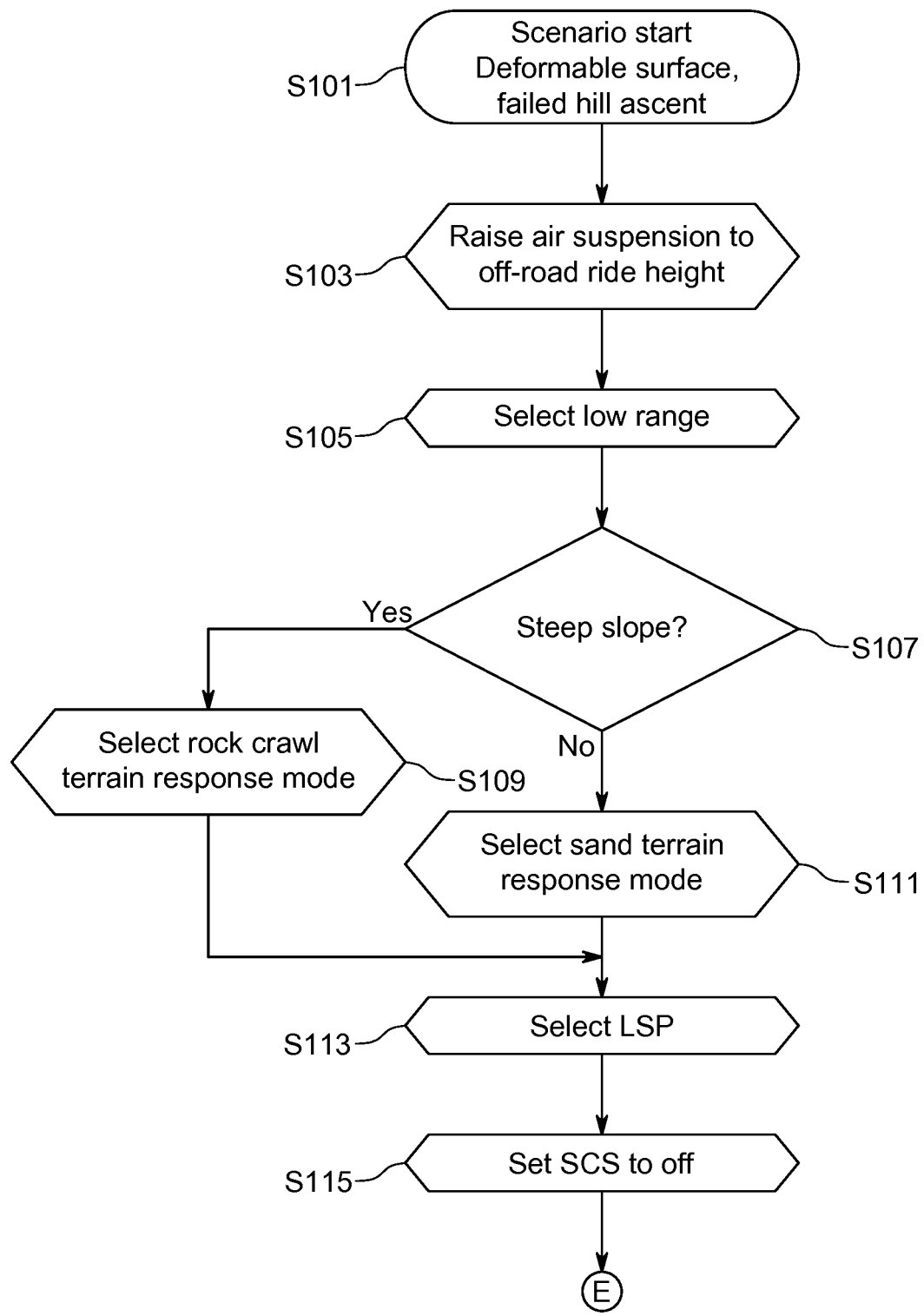
FIG. 6 is a flow chart illustrating operation of a vehicle according to the embodiment of FIG. 1 in an example scenario.
Figure 6:
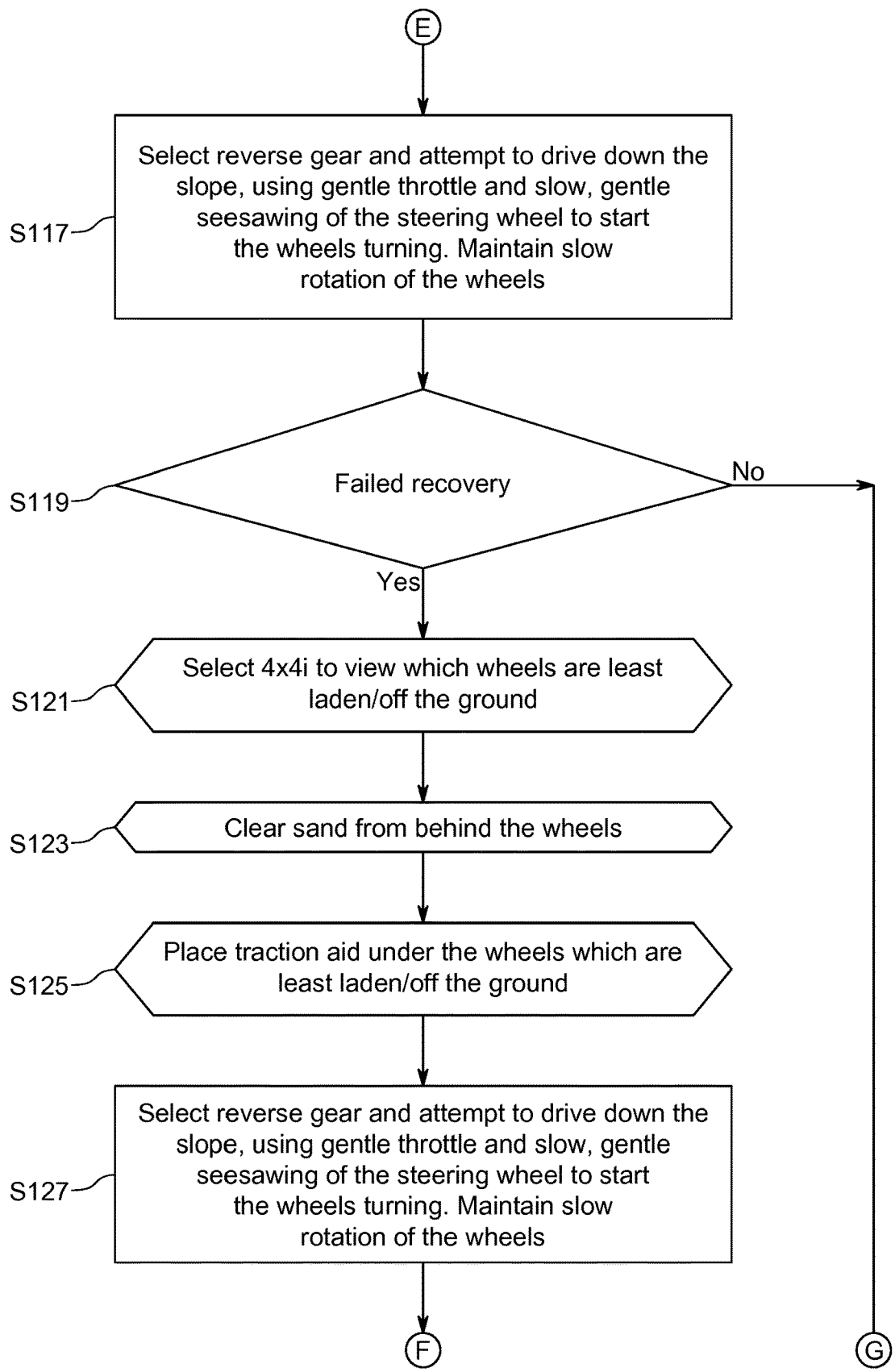
Figure 6:
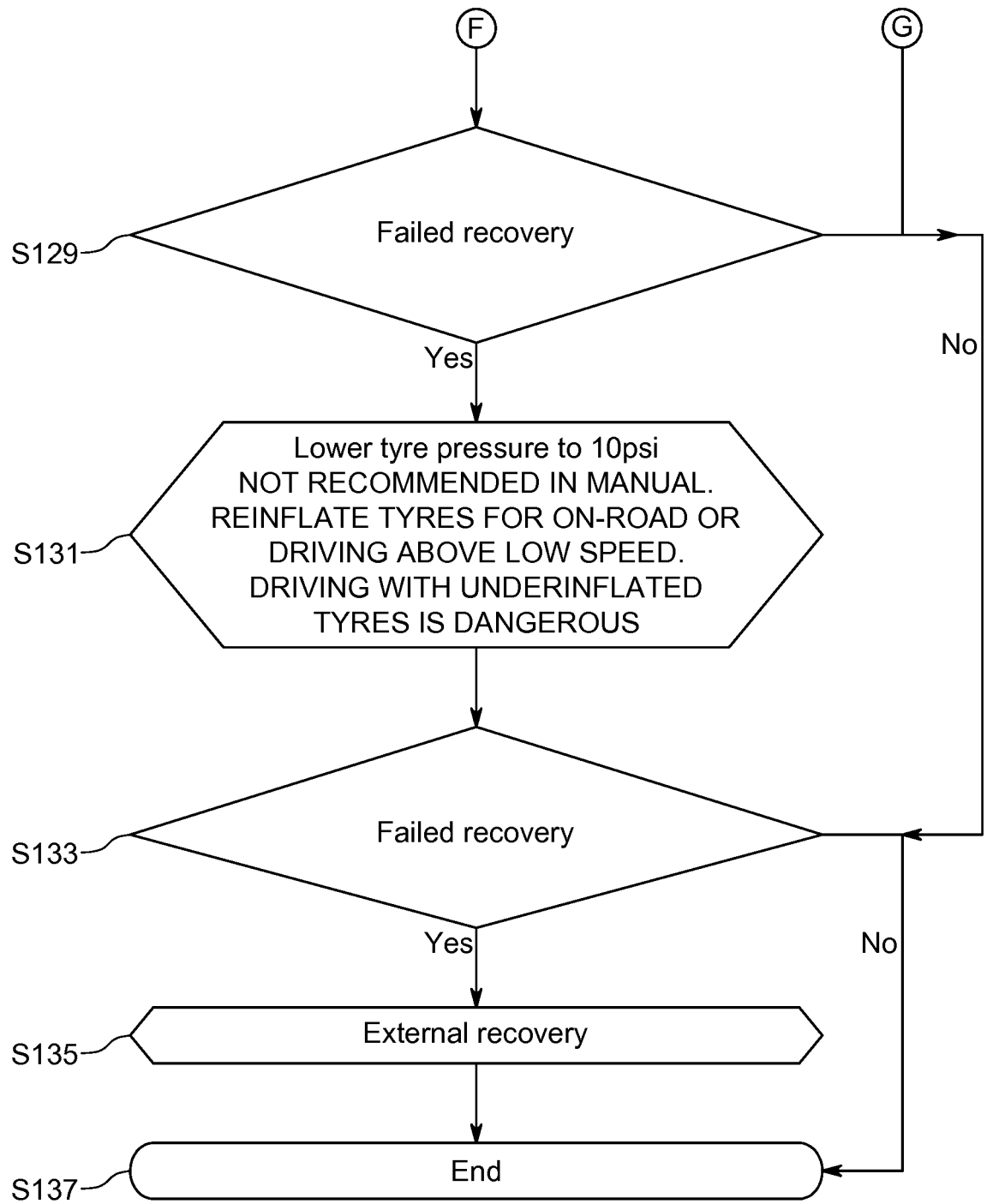

FIG. 6 illustrates an example of a scenario in which a method according to an embodiment of the present invention is implemented by the vehicle 100 of FIG. 1.

At step S101 the vehicle 100 has become stuck attempting to ascend a hill having a deformable surface (such as sand or snow). The VCU 10 has determined that at least one wheel has lost traction and that at least one such wheel is at substantially full droop in the manner described above, i.e. by reference to vehicle reference speed, wheel speed and wheel droop.

At step S103 the VCU 10 provides an output to a driver (in the form of a textual display on a display screen 10D, in the present embodiment a touch screen display screen 10D) suggesting that the driver raise the vehicle ride height to an 'off road' ride height setting if this setting is not already selected. In the present embodiment, the VCU 10 waits until the VCU 10 detects that the off-road ride height has been selected before proceeding to the next step. In some alternative embodiments the VCU 10 may simply wait until the user provides an input to the VCU 10 (such as by pressing an 'OK' button on the display screen 10D) before proceeding to the next step. In the present embodiment the 'off-road' ride height is the highest ride height achievable by the vehicle 100.

At step S105 the VCU 10 provides an output to a driver suggesting that the driver selects the low range setting of PTU 131P. Once the VCU 10 detects that the low range setting of the PTU 131P has been selected the VCU 10 proceeds to step S107. It is to be understood that, in the present embodiment, the VCU 10 is configured to allow a driver to 'skip' a step if the driver wishes to do so, by providing an appropriate input. This feature is helpful in the event that a particular function (such as PTU low range) is unavailable or the driver determines that a particular function is not suitable under the prevailing conditions.

At step S107 the VCU 10 determines whether the slope of the driving surface exceeds a predetermined value. If it does, the VCU 10 continues at step S109 else the VCU 10 continues at step S111. In the present embodiment the predetermined value is substantially 25 degrees above the horizontal, but other values may be useful in some embodiments.

At step S109 the VCU 10 provides an output to a driver suggesting that the driver selects the Rock Crawl terrain response (TR) mode, in order to lock the front and rear differentials 137, 135 respectively. Once the VCU 10 detects that the Rock Crawl TR mode has been selected the VCU 10 proceeds to step S113.

At step S111 the VCU 10 provides an output to the driver suggesting that the driver selects the Sand terrain response (TR) mode. Once the VCU 10 detects that the sand TR mode has been selected the VCU 10 proceeds to step S113.

At step S113, since the vehicle 100 includes a low-speed progress control system 12, the VCU 10 causes the LSP system 12 to activate. At step S115 the VCU 10 sets the vehicle SCS to 'off'. That is, SCS functionality is disabled. It is to be understood that some embodiments may refer to the stability control system, or a portion of the functionality thereof, as a dynamic stability control system (DSC).

In embodiments not having an LSP control system 12, the VCU 10 may proceed directly from step S109 or step S111 to step S117.

At step S117 the VCU 10 provides an output to a driver suggesting that the driver selects reverse gear and attempts to drive backwards down the slope, using gentle throttle (accelerator pedal 161) and slow, gentle see-sawing of the steering wheel 171 to start the wheels turning. The driver is advised to maintain slow rotation of the wheels 111, 112, 114, 115. After a predetermined time period has elapsed since step S117 commenced, the VCU 10 then continues at step S119. In the present embodiment the predetermined time period is 5 minutes although other periods may be useful in some embodiments such as 1 minute, 2 minutes, 7 minutes, 10 minutes or any other suitable period.

At step S119 the VCU 10 provides an output to a driver requesting the driver to provide an indication as to whether recovery of the vehicle 100 has failed. In the present embodiment the VCU 10 invites the driver to provide a YES/NO indication by pressing an appropriate icon on the display screen 10D. If the driver indicates that recovery has failed the VCU 10 proceeds to step S121. If the driver provides an indication that recovery has not failed, the VCU 10 proceeds to end the recovery instruction process at step S137.

In some alternative embodiments the VCU 10 may endeavour to determine automatically whether recovery of the vehicle 100 has failed. In an embodiment, the VCU 10 accomplishes this by monitoring vehicle wheel speed and vehicle reference speed. The VCU 10 may determine that recovery has failed if the conditions exist that the vehicle reference speed is substantially zero, and one or more wheels are spinning at a speed exceeding a predetermined value such as 2 kph, 3 kph, 5 kph or any other suitable value for a predetermined time period. If this is determined to be the case, the VCU 10 proceeds to step S121. If this determined not to be the case the VCU 10 proceeds to end the recovery instruction process at step S137.

It is to be understood that the predetermined time period may be any suitable value such as 0.5 s, 1 s or any other suitable value. This feature enables the VCU 10 to distinguish between initial wheel spin due to aggressive acceleration from rest on a surface of relatively high surface coefficient of friction and wheel spin due to a vehicle being beached or otherwise unable to move over a surface.

At step S121 the VCU 10 selects the '4×4i' mode in which the VCU 10 displays on the instrument cluster 100IC a diagram (schematic plan view) of the vehicle 100 and provides an indication of the one or more wheels that have lost traction and are therefore spinning when the accelerator pedal 161 is depressed sufficiently.

At step S123 the VCU 10 provides an output to a driver suggesting that the driver clear sand from behind the one or more wheels that have lost traction. (It is to be understood that, in the case that the VCU 10 determined that the vehicle 100 was descending a slope, the VCU 10 may instead suggest that the driver clear sand from in front of the one or more wheels that have lost traction with the driving surface).

At step S125 the VCU 10 provides an output to a driver suggesting that the driver place a traction aid (such as one of the aids 100M shown in FIG. 5(a)) under the wheels that have lost traction. In the present embodiment the traction aid 100M comprises a flexible polymeric mat although other traction aids may be useful in some embodiments such as boards (e.g. sand boards), tyre socks, or any other suitable traction aid.

At step S127 the VCU 10 provides an output to a driver suggesting that the driver selects reverse gear and attempts to drive backwards down the slope, using gentle throttle (accelerator pedal 161) and slow, gentle see-sawing of the steering wheel 171 to start the wheels turning. The VCU 10 suggests to the driver that the driver maintain slow rotation of the wheels 111, 112, 114, 115. The VCU then continues at step S129.

After a predetermined time period has elapsed since step S127 commenced, the VCU then continues at step S129. At step S129 the VCU 10 provides an output to a driver requesting the driver to provide an indication as to whether recovery of the vehicle 100 has failed. In the present embodiment the VCU 10 again invites the driver to provide a YES/NO indication by pressing an appropriate icon on the display screen 10D. If the driver indicates that recovery has failed the VCU 10 proceeds to step S131. If the driver provides an indication that recovery has not failed, the VCU 10 proceeds to end the recovery instruction process at step S137. In the present embodiment the predetermined time period is 5 minutes although other periods may be useful in some embodiments such as 1 minute, 2 minutes, 7 minutes, 10 minutes or any other suitable period.

At step S131 the VCU 10 suggests to the driver to lower the tyre pressures to a predetermined value in order to assist in vehicle recovery. In the present embodiment the VCU 10 suggests a pressure of substantially 10 psi although other values may be useful in some embodiments. The VCU 10 suggests that lowering the tyre pressures to this value is not recommended if the vehicle 100 is to be operated in a manual driving mode (as opposed to operation with the LSP control system 12 active). In the present embodiment the driver is invited to provide an indication to the VCU 10 when the tyre pressures have been adjusted, if at all, and the driver is continuing the recovery attempt.

After the predetermined time period (5 minutes in the present embodiment) has elapsed since the driver provided the indication that he is continuing the recovery attempt, the VCU 10 proceeds to step S133. At step S133 the VCU 10 again provides an output to a driver requesting the driver to provide an indication as to whether recovery of the vehicle 100 has failed. In the present embodiment the VCU 10 again invites the driver to provide a YES/NO indication by pressing an appropriate icon on the display screen 10D. If the driver indicates that recovery has failed the VCU 10 proceeds to step S135. If the driver provides an indication that recovery has not failed, the VCU 10 proceeds to end the recovery instruction process at step S137. At the present step, the predetermined time period is a period of 5 minutes, although other time periods may be useful in some embodiments.

At step S135 the VCU 10 provides an output to the driver suggesting that external assistance in recovering the vehicle 100 should be sought. The VCU 10 then proceeds to end the recovery instruction process at step S137.

Figure 7:
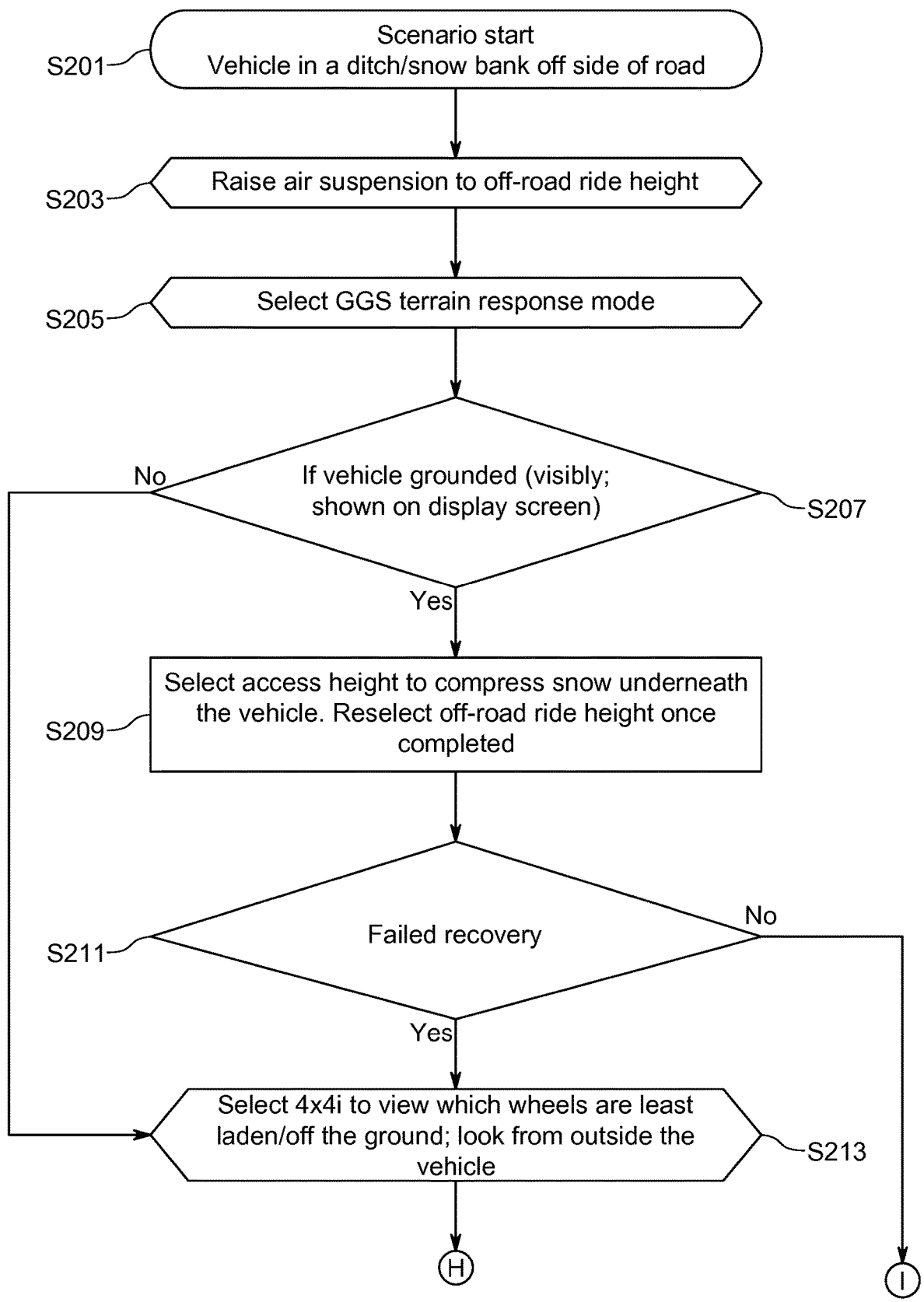
FIG. 7 is a flow chart illustrating operation of a vehicle according to the embodiment of FIG. 1 in a further example scenario.
Figure 7:
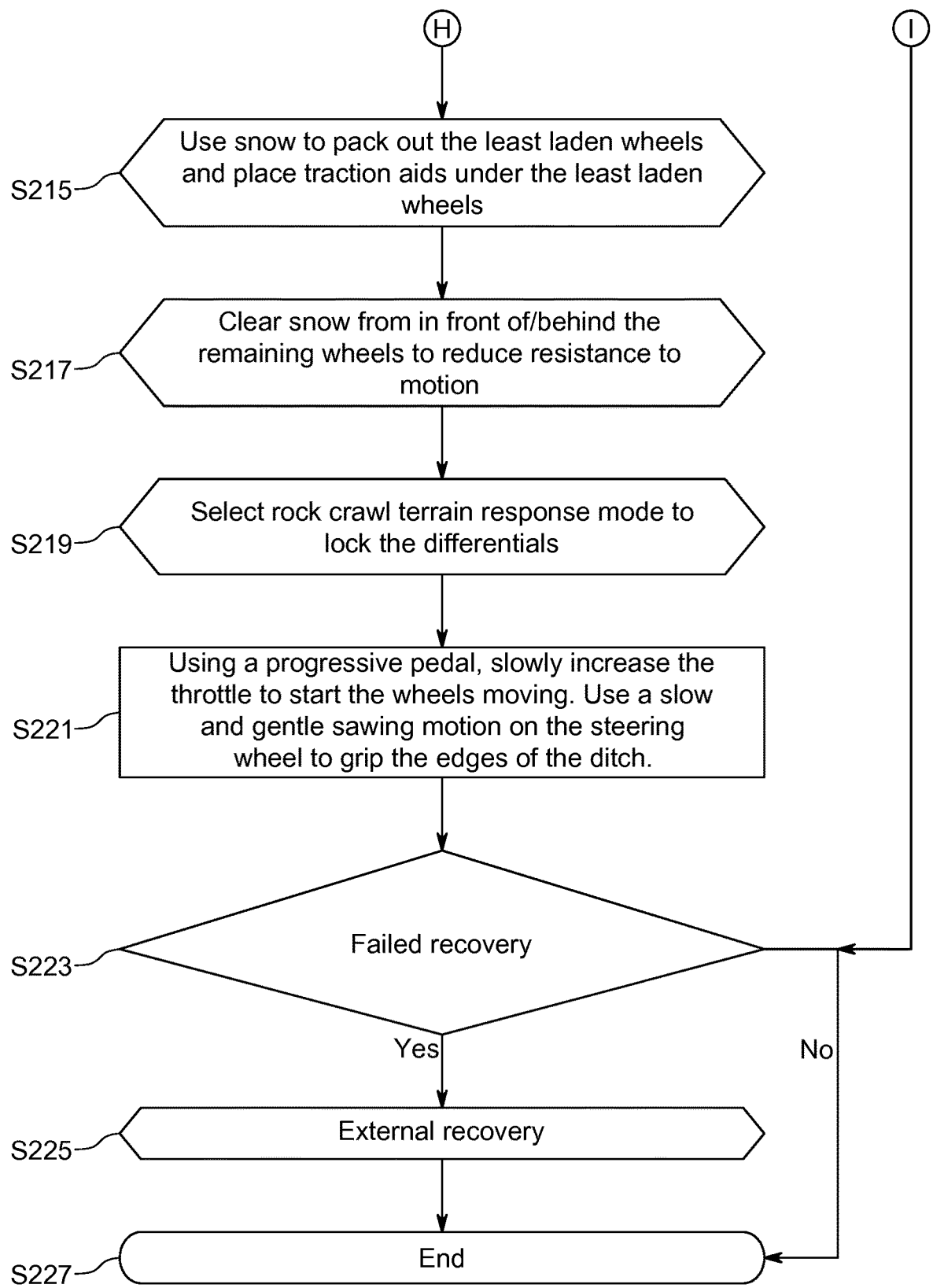

FIG. 7 illustrates an example of a scenario in which a method according to an embodiment of the present invention is implemented by the vehicle 100 of FIG. 1.

At step S201 the vehicle 100 has become stuck in a ditch or snow bank at the side of a road. The VCU 10 has determined that at least one wheel has lost traction and that at least one such wheel is at substantially full droop in the manner described above, i.e. by reference to vehicle reference speed, wheel speed and wheel droop.

At step S203 the VCU 10 provides an output to a driver (in the form of a textual display on the display screen 10D) suggesting that the driver raise the vehicle ride height to the 'off road' ride height setting if this setting is not already selected, this setting being the highest available ride height in the present embodiment as noted above. In the present embodiment, the VCU 10 waits until the VCU 10 detects that the off-road ride height has been selected before proceeding to the next step. In some alternative embodiments the VCU 10 may simply wait until the user provides an input to the VCU 10 (such as by pressing an 'OK' button on the display screen 10D) before proceeding to the next step.

At step S205 the VCU 10 provides an output to a driver suggesting that the driver selects the GGS driving mode. In vehicles having a 'snow and ice' driving mode in addition to or instead of a GGS mode the VCU 10 may suggest that the driver selects the 'snow and ice' mode. Once the VCU 10 detects that the GGS mode has been selected the VCU 10 proceeds to step S207.

At step S207 the VCU 10 determines whether the vehicle 100 is currently grounded, i.e. with an underside of the vehicle 100 resting on ground. The vehicle VCU 10 does this by inviting the driver to provide a YES/NO indication by pressing an appropriate icon on the display screen 10D. If the driver indicates that the vehicle 100 is grounded, the VCU 10 continues at step S209 else the VCU 10 continues to step S213.

At step S209 the VCU 10 invites the driver to select the lowest ride height available, in the present embodiment this ride height is referred to as the 'access' ride height. Once the access ride height has been achieved, the VCU 10 invites the driver to reselect the 'off-road' ride height.

Once the VCU 10 detects that the driver has reselected the off-road ride height, the VCU 10 continues at step S211.

At step S211 the VCU 10 provides an output to the driver requesting the driver to provide an indication as to whether recovery of the vehicle 100 has failed. In the present embodiment the VCU 10 invites the driver to provide a YES/NO indication by pressing an appropriate icon on the display screen 10D. If the driver indicates that recovery has failed the VCU 10 proceeds to step S213. If the driver provides an indication that recovery has not failed, the VCU 10 proceeds to end the recovery instruction process at step S227.

At step S213 the VCU 10 prompts the driver to determine which wheels of the vehicle 100 are least laden or, if any wheel is not in contact with ground, identify any such wheel. The driver is prompted to do so either by reference to information in respect of wheel speed and wheel articulation that the VCU 10 is able to provide, in the present embodiment provided by the '4×4i' feature, or by visual inspection.

At step S215 the driver is advised to use snow to pack out the least laden wheels (or any wheel not in contact with ground, if any such wheel is not in contact with ground) and to place a traction aid under such one or more wheels.

At step S217 the driver is advised to clear snow from in front of or behind the remaining wheels, depending on the intended direction of travel of the vehicle 100, in order to reduce resistance to motion of the vehicle as the driver subsequently attempts to recover the vehicle 100.

At step S219 the driver is advised to select the 'rock crawl' driving mode in order to lock the front and rear differentials 137, 135 respectively.

At step S221 the driver is advised to progressively depress the accelerator pedal 161 in order to start turning the driving wheels of the vehicle 100. The driver is also advised to use a slow and gentle sawing motion (alternating left to right motion) of the steering wheel 171 in order to assist the wheels to grip the edges of the ditch in which the vehicle 100 is located.

After a predetermined time period has elapsed since step S221 commenced, the VCU 10 proceeds to step S223. In the present embodiment the predetermined time period is 5 minutes although other time periods may be useful in some embodiments.

At step S223 the VCU 10 again provides an output to a driver requesting the driver to provide the YES/NO indication as to whether recovery of the vehicle 100 has failed by pressing an appropriate icon on the display screen 10D. If the driver indicates that recovery has failed the VCU 10 proceeds to step S225. If the driver provides an indication that recovery has not failed, the VCU 10 proceeds to end the recovery instruction process at step S227.

At step S225 the VCU 10 advises the driver to seek external assistance in order to effect recovery of the vehicle 100, and then proceeds to step S227.

At step S227 the VCU 10 terminates advising the driver in respect of vehicle recovery.

Figure 8:
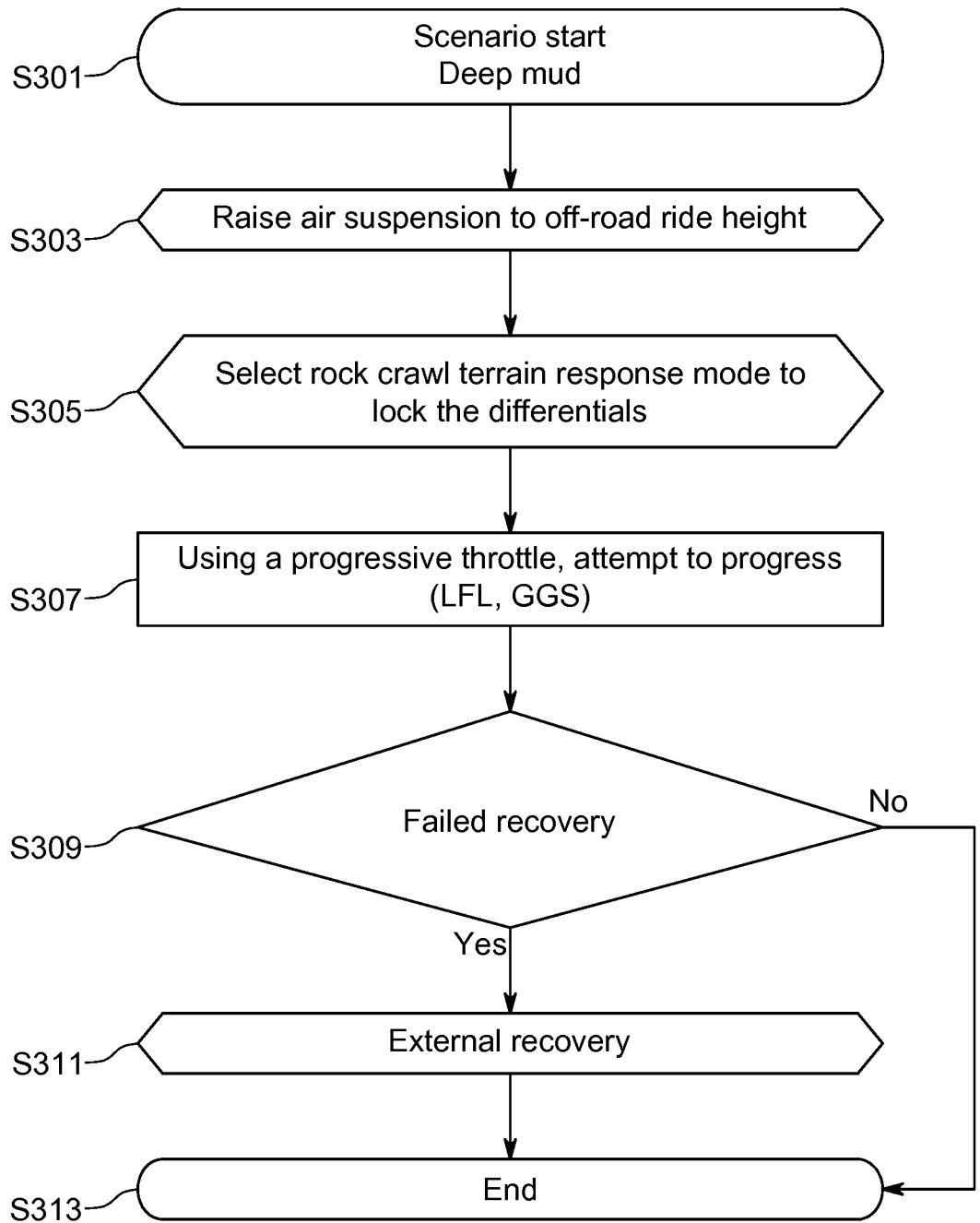
FIG. 8 is a flow chart illustrating operation of a vehicle according to the embodiment of FIG. 1 in an example scenario.

FIG. 8 illustrates an example of a scenario in which a method according to an embodiment of the present invention is implemented by the vehicle 100 of FIG. 1.

At step S301 the vehicle 100 has become stuck in relatively deep mud. The VCU 10 has determined that at least one wheel has lost traction and that at least one such wheel is at substantially full droop in the manner described earlier, i.e. by reference to vehicle reference speed, wheel speed and wheel droop.

At step S303 the VCU 10 provides an output to a driver (in the form of a textual display on the display screen 10D)

suggesting that the driver raise the vehicle ride height to the 'off road' ride height setting if this setting is not already selected, this setting being the highest available ride height in the present embodiment as noted above. In the present embodiment, the VCU 10 waits until the VCU 10 detects that the off-road ride height has been selected before proceeding to the next step. In some alternative embodiments the VCU 10 may simply wait until the user provides an input to the VCU 10 (such as by pressing an 'OK' button on the display screen 10D) before proceeding to the next step.

At step S305 the VCU 10 provides an output to a driver suggesting that the driver selects the 'rock crawl' driving mode in order to lock the front and rear differentials 137, 135 respectively.

At step S307 the driver is advised to progressively depress the accelerator pedal 161 in order to start turning the driving wheels of the vehicle 100. After the predetermined time period has elapsed, being 5 minutes in the present example, the VCU 10 proceeds to step S309. Other lengths of the predetermined time period may be useful in some embodiments.

At step S309 the VCU 10 provides an output to a driver requesting the driver to provide the YES/NO indication as to whether recovery of the vehicle 100 has failed by pressing an appropriate icon on the display screen 10D. If the driver indicates that recovery has failed the VCU 10 proceeds to step S311. If the driver provides an indication that recovery has not failed, the VCU 10 proceeds to end the recovery instruction process at step S313.

At step S311 the VCU 10 advises the driver to seek external assistance in order to effect recovery of the vehicle 100, and then proceeds to step S313.

At step S313 the VCU 10 terminates advising the driver in respect of vehicle recovery.

Figure 9:
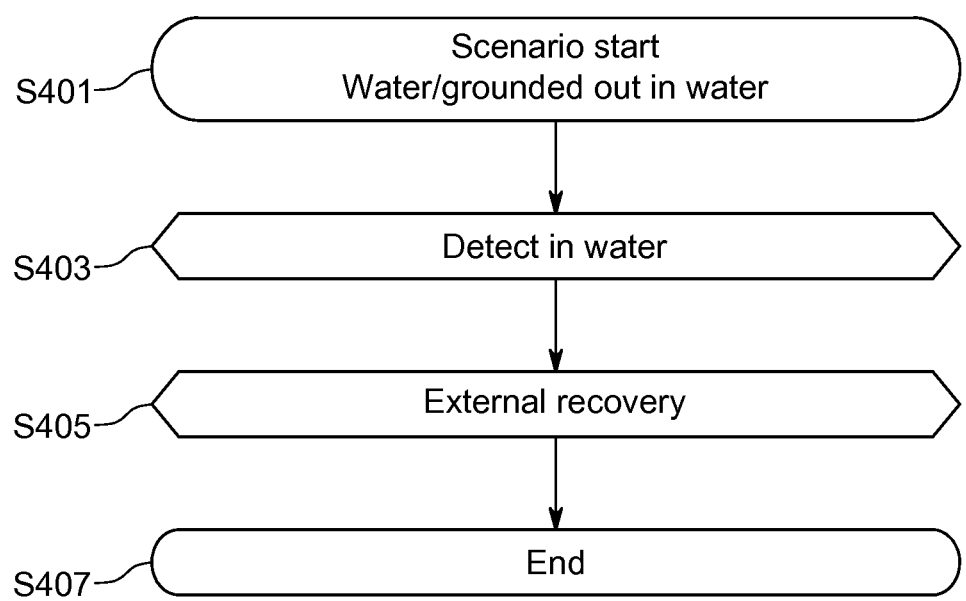
FIG. 9 is a flow chart illustrating operation of a vehicle according to the embodiment of FIG. 1 in a further example scenario.

FIG. 9 illustrates an example of a scenario in which a method according to an embodiment of the present invention is implemented by the vehicle 100 of FIG. 1.

At step S401 the vehicle 100 has become grounded in water. In the present example, an underbelly portion of the vehicle 100, between front and rear pairs of wheels, is in contact with ground. The VCU 10 has determined that at least one wheel has lost traction and that at least one such wheel is at substantially full droop in the manner described earlier, i.e. by reference to vehicle reference speed, wheel speed and wheel droop.

At step S403 the VCU 10 detects that the vehicle 100 is in a body of water having a depth exceeding a predetermined depth, in the present embodiment a depth of 300 mm. In the present embodiment the VCU 10 does this by reference to signals generated by parking distance control (PDC) sensors P indicating the distance of the respective sensor from a terrain surface including, in the present case, the surface of a body of water in which the vehicle 100 is wading. If a given sensor P is submerged in the water, the VCU 10 is able to detect this based on the signal received from the sensor P.

In the present embodiment the PDC sensors P are ultrasonic sensors although other sensors such as radar sensors may be useful in some alternative embodiments. Having detected that the vehicle 100 is in a body of water exceeding the predetermined depth, the VCU 10 continues at step S405.

At step 405 the VCU 10 advises the driver to seek external assistance in order to effect recovery of the vehicle 100, and then proceeds to step S407.

At step S407 the VCU 10 terminates advising the driver in respect of vehicle recovery.

Figure 10:
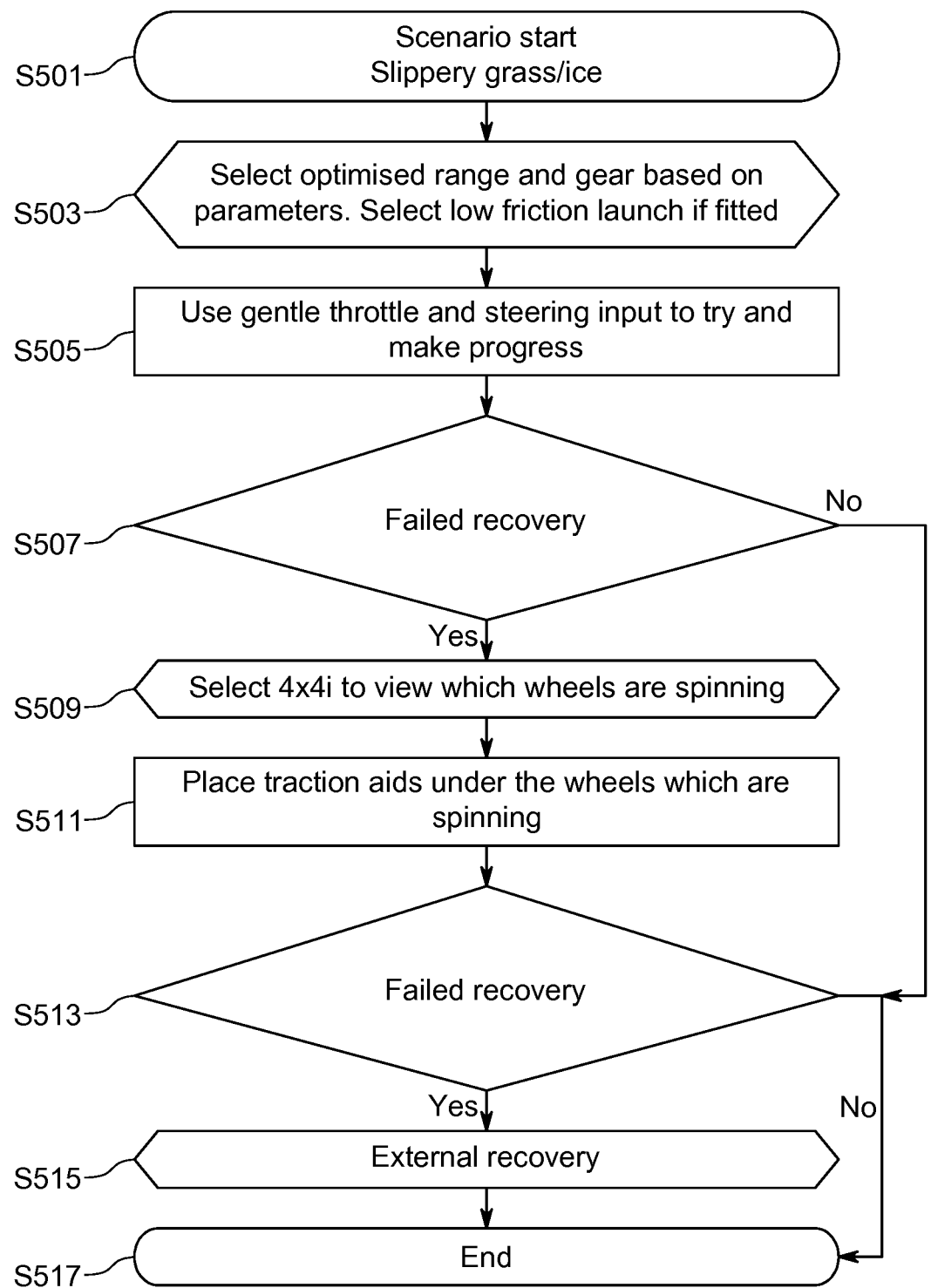
FIG. 10 is a flow chart illustrating operation of a vehicle according to the embodiment of FIG. 1 in an example scenario.

FIG. 10 illustrates an example of a scenario in which a method according to an embodiment of the present invention is implemented by the vehicle 100 of FIG. 1.

At step S501 the vehicle 100 has become stuck on slippery grass or ice. The VCU 10 has determined that at least one wheel has lost traction and that at least one such wheel is at substantially full droop in the manner described earlier, i.e. by reference to vehicle reference speed, wheel speed and wheel droop.

At step S503 the VCU 10 provides an output to a driver suggesting that the driver selects the 'GGS' driving mode. In some alternative embodiments, the VCU 10 may suggest that the driver selects a 'low friction launch' feature, where fitted, or a particular vehicle configuration such as a particular powertrain configuration (e.g. a particular transmission gear and hi/lo power transfer unit (PTU) 131P setting). It is to be understood that the low friction launch feature is a feature in which the VCU 10 controls driven wheels of the powertrain in order to reduce wheel slip. In some embodiments, in the low friction launch feature, the VCU 10 causes a braking system of the vehicle to apply brake force to at least a pair of driven wheels of the same axle in order to reduce wheel flare (spin) when drive torque is applied, thereby assisting the vehicle in gaining traction over a relatively slippery surface.

At step S505 the driver is advised to progressively depress the accelerator pedal 161 in order to start turning the driving wheels of the vehicle 100, and to gently see-saw the steering wheel 171 repeatedly from side to side (left to right to left and so forth). After the predetermined time period has elapsed, being 5 minutes in the present example, the VCU 10 proceeds to step S507. Other lengths of the predetermined time period may be useful in some embodiments.

At step S507 the VCU 10 provides an output to a driver requesting the driver to provide the YES/NO indication as to whether recovery of the vehicle 100 has failed by pressing an appropriate icon on the display screen 10D. If the driver indicates that recovery has failed the VCU 10 proceeds to step S509. If the driver provides an indication that recovery has not failed, the VCU 10 proceeds to end the recovery instruction process at step S517.

At step S509 the VCU 10 selects the '4×4i' mode in which, as described above, the VCU 10 displays on the instrument cluster 100IC a diagram (schematic plan view) of the vehicle 100 and provides an indication of the one or more wheels that have lost traction and are therefore spinning when the accelerator pedal 161 is depressed sufficiently, and an indication as to which wheel is at full droop.

At step S511 the VCU 10 provides an output to a driver suggesting that the driver place a respective traction aid under each wheel that is spinning (i.e. has lost traction) and then continue attempting to drive the vehicle 100 from its current location. The VCU 10 prompts the driver to provide the YES indication via the display screen 10D when one or more traction aids have been deployed, before attempting to drive the vehicle 100.

After the predetermined time period has elapsed since the driver provided the YES indication at step S511, being 5 minutes in the present example, the VCU 10 proceeds to step S513. Other lengths of the predetermined time period may be useful in some embodiments.

At step S513 the VCU 10 provides an output to a driver requesting the driver to provide the YES/NO indication as to whether recovery of the vehicle 100 has failed by pressing an appropriate icon on the display screen 10D. If the driver indicates that recovery has failed the VCU 10 proceeds to step S515. If the driver provides an indication that recovery has not failed, the VCU 10 proceeds to end the recovery instruction process at step S517.

At step S515 the VCU 10 advises the driver to seek external assistance in order to effect recovery of the vehicle 100, and then proceeds to step S517.

At step S517 the VCU 10 terminates advising the driver in respect of vehicle recovery.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An electronic controller for a vehicle, the controller configured to:
   determine when at least one wheel has lost traction;
   in response to determining that the at least one wheel has lost traction, provide an output to a driver indicative of the location of the at least one wheel that has lost traction;
   receive information indicative of a driving surface gradient;
   when the vehicle is stationary and in response to determining that the at least one wheel has lost traction, provide an indication to the driver whether a physical traction aid should be placed next to the at least one wheel indicated to have lost traction in dependence at least in part on the driving surface gradient; and
   when the vehicle is stationary and the at least one wheel has lost traction, to provide an indication to the driver whether the physical traction aid should be placed in front of the at least one wheel or behind the at least one wheel in dependence at least in part on the driving surface gradient, and wherein if the information indicative of the driving surface gradient indicates that the vehicle is travelling up the gradient, to provide an indication that the physical traction aid should be placed behind the at least one wheel, and if the information indicative of the driving gradient indicates that the vehicle is travelling down the gradient, to provide an indication that the physical traction aid should be placed in front of the at least one wheel.

2. The controller according to claim 1, further configured to receive information indicative of an amount of droop of the at least one wheel, wherein if the vehicle is stationary and the controller determines that the at least one wheel has lost traction and is at full droop, the controller is further configured to provide a recommendation to the driver to raise a ride height of the vehicle.

3. The controller according to claim 1, further configured to receive information indicative of an amount of droop of the at least one wheel, wherein if the vehicle is stationary and the controller determines that the at least one wheel has lost traction and is at full droop, the controller is further configured automatically to raise a ride height of the vehicle.

4. The controller according to claim 3, further configured automatically to request a driver to confirm that the driver wishes ride height to be raised, the controller being configured automatically to cause ride height to be raised if the driver confirms that the driver wishes ride height to be raised.

5. The vehicle comprising the controller of claim 1.

6. A method implemented by an electronic controller, the method comprising:
   determining when at least one wheel of a vehicle has lost traction;
   in response to determining that the at least one wheel has lost traction, providing an output to a driver indicative of the location of the at least one wheel that has lost traction;
   receiving information indicative of driving surface gradient;
   when the vehicle is stationary and in response to determining that the at least one wheel has lost traction, providing an indication to the driver whether a physical traction aid should be placed next to the at least one wheel indicated to have lost traction in dependence at least in part on the driving surface gradient; and
   when the vehicle is stationary and the at least one wheel has lost traction, providing an indication to the driver whether the physical traction aid should be placed in front of the at least one wheel or behind the at least one wheel in dependence at least in part on the driving surface gradient, and wherein if the information indicative of the driving surface gradient indicates that the vehicle is travelling up the gradient, providing an indication that the physical traction aid should be placed behind the at least one wheel, and if the information indicative of the driving gradient indicates that the vehicle is travelling down the gradient, providing an indication that the physical traction aid should be placed in front of the at least one wheel.

7. The method according to claim 6, further comprising receiving information indicative of an amount of droop of the at least one wheel, whereby if the vehicle is stationary and it is determined that the at least one wheel has lost traction and is at full droop, the method further comprises providing a recommendation to the driver to raise a ride height of the vehicle.

8. The method according to claim 6, further comprising receiving information indicative of an amount of droop of the at least one wheel, wherein if the vehicle is stationary and it is determined that the at least one wheel has lost traction and is at full droop, the method further comprises automatically raising a ride height of the vehicle.

9. The method according to claim 8, wherein the controller is configured automatically to request a driver to confirm that the driver wishes ride height to be raised, the method further comprising automatically causing ride height to be raised if the driver confirms that the driver wishes ride height to be raised.

10. A non-transitory computer readable carrier medium carrying computer readable code for controlling the vehicle to carry out the method of claim 6.

* * * * *